July 1, 1958
K. A. CLIFTON
2,840,920
ORIFICE PLATE CENTERING GAUGE
Filed Oct. 21, 1954
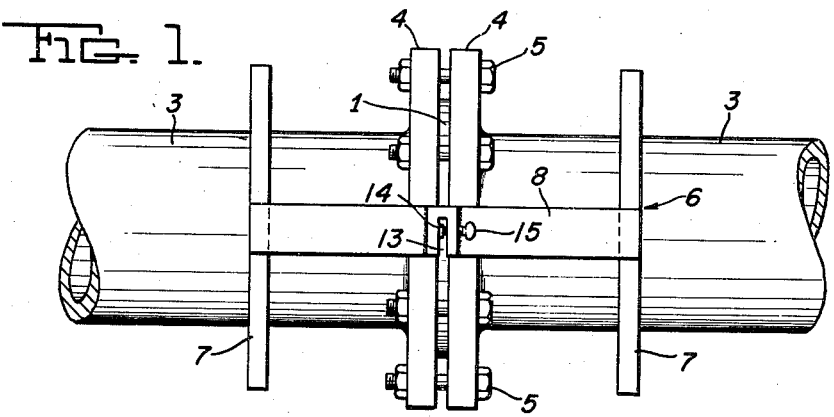
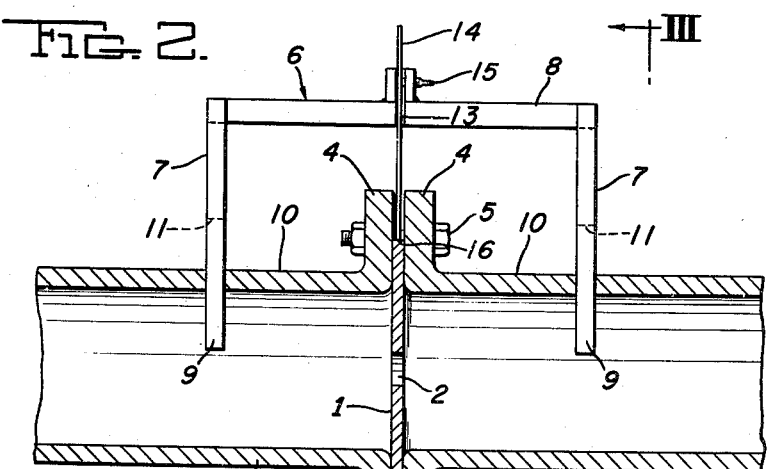
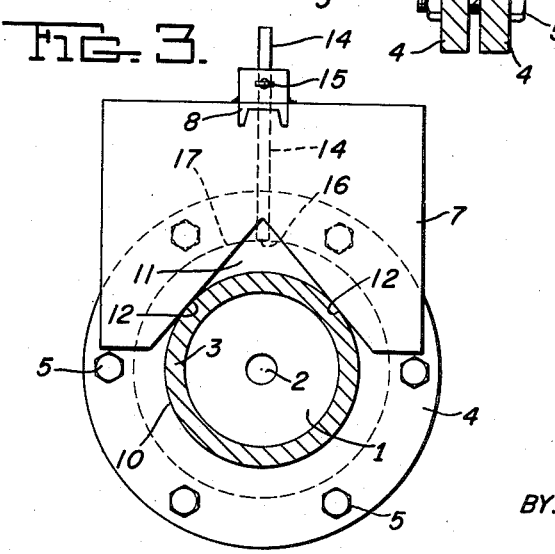
INVENTOR:
KENNETH A. CLIFTON,
BY: Donald G. Dalton
his Attorney.

United States Patent Office 2,840,920
Patented July 1, 1958

2,840,920

ORIFICE PLATE CENTERING GAUGE

Kenneth A. Clifton, Hubbard, Ohio

Application October 21, 1954, Serial No. 463,767

2 Claims. (Cl. 33—180)

This invention relates to a gauge for centering the position in a pipe conduit of a plate having a concentric metering orifice and, more specifically to a gauge in the form of a saddle which will bridge the connecting joint provided by the end flanges of adjacent pipes between which the orifice plate is normally positioned.

Metering orifices are commonly arranged between facing flanges on adjacent ends of a pair of pipes forming a part of a pipe conduit, the pipe flanges having clamping engagement with a plate in which the metering orifice is concentrically located. The metering orifice is centered conventionally with respect to the pipe conduit by adjusting its position with reference to the periphery of the pipe flanges. However, this practice does not always result in an accurately centered orifice since the periphery of the pipe flanges is not generally concentric with respect to the pipe. The eccentricity of the pipe flange periphery arises as a result of the outside diameter of the flanges not being true and the provision of a weld of non-uniform thickness along its internal periphery with the exterior surface of the pipe. Metering orifices which are not accurately centered because of these and other causes result in inaccurate metering.

One of the principal objects of this invention is to provide a gauge which will facilitate and provide a more accurate concentric mounting of an orifice metering plate with respect to a pipe conduit.

A further object of the invention is to provide a gauge which may be mounted exteriorly of a pipe conduit and when so mounted will provide a reference of its axis or center for gauging the position of a metering orifice plate.

A still further object of the invention is to provide a tool for centering metering orifice plates in a conduit comprising a gauging member for insertion between the flanges on adjacent ends of a pair of pipes to gauge the position of a metering orifice plate therebetween, and a support for the gauging member in the form of a mechanical bridge over the pipe flanges having means engageable with the exterior surfaces of the pipes for determining the position of the gauging member with respect to the pipe center or axis in such manner that its engagement with the pipes places the gauging member in a predetermined position with respect to the pipe center.

Other objects and advantages of the invention will be apparent from the following description.

In the drawings there is shown a preferred embodiment of the invention. In this showing:

Figure 1 is a plan view of the metering gauge of this invention illustrating its operative gauging position with respect to a pair of pipes having connecting flanges at their ends;

Figure 2 is a side elevational view of the metering gauge shown in Figure 1, the conduit and orifice plate being shown in vertical section; and Figure 3 is a sectional view taken along the line III—III of Figure 2.

In the drawings, the numeral 1 designates a circular plate having an opening 2 at its center providing a metering orifice in a conduit formed in part by a pair of pipes 3. Adjacent ends of the pipes 3 have flanges 4 which are provided with openings for the reception of bolts 5 for clamping the flanges 4 together to connect the pipes 3 to each other. The plate 1 is arranged in the axial space between the flanges 4 and must be centered so that its orifice 2 and the axis of the conduit will be concentric.

The tool of this invention for gauging the position of the plate 1 centrally of the conduit is a mechanical bridge designated as a whole by the numeral 6 which has an inverted U-shape including legs 7 and a center portion 8 securing the outer ends of the legs 7 to each other. The inner ends 9 of the legs 7 engage with the external surfaces 10 of the pipes 3 at points spaced axially outwardly from the mounting flanges 4 so that the legs 7 operate to space the center portion 8 radially outwardly with respect to the clamping flanges 4. As best shown in Figure 2, each of the legs 7 is provided with a V-shaped slot 11 which provides for engagement of the legs with the pipe surfaces 10 at two angularly spaced points 12 and in such manner that the center portion 8 is held in a position parallel to the axis of the pipes 3 when the legs 7 are engaged with the exterior surfaces 10 thereof. The gauge 6 in effect provides a mechanical bridge the center portion 8 of which extends over the flanges 4 and provides a reference with respect to the axis of the pipes 3.

The center portion 8 has a slot 13 at its center in which a gauge member 14 is received. A clamp 15 is provided for holding the gauge member 14 in a position extending radially of the pipes 3 and centrally with respect to the V-shaped slots 11. As will be apparent from Figures 2 and 3, the gauge member 14 lies in a radial plane which bisects the slots 11. The radial position of the gauging member 14 in the slot 13 is of course adjusted by operation of the clamp 15 so that its lower or inner end 16 is operative to gauge the position of the metering plate 1 regardless of the angular position with respect to the pipes 3 in which the tool is placed in gauging engagement with the exterior surfaces 10.

In operation of the tool 6 to gauge the position of the metering plate 1, the plate 1 is first placed between the flanges 4 after which the bolts 5 are applied and tightened loosely so that the plate 1 will be held against movement by frictional engagement of the flanges 4 therewith. The tool 6 is then manipulated to insert its gauging part between the flanges 4 to a position determined by engagement of its legs 7 with the exterior surface 10 of the pipes 3. The position of the plate 1 is adjusted by tapping with a hammer and a bar until the end 16 of the gauging member 14 will have uniform engagement with the periphery 17 of the metering plate 1 in any of the several positions about the conduit in which it may be placed. The bolts 5 are then tightened to secure the plate 1 in its centered position.

Attention is particularly directed to the fact that the placing of the legs 7 in engagement with the surfaces 10 at points 12 which are spaced both circumferentially relative to each other and axially from the flanges 4 automatically places the center portion 8 in a predetermined position with respect to the center of the conduit and in a position spaced from the outer edge of the flanges 4 and straddling such flanges.

While one embodiment of my invention has been shown and described it will be apparent that other adaptations and modifications may be made without departing from the scope of the following claims.

I claim:

1. A tool for centering a circular metering orifice plate between facing flanges on adjacent ends of a pair of pipes forming a part of a fluid conduit comprising a gauging member for insertion between said flanges from any of a plurality of circumferentially spaced positions and having a part at its inner end for gauging engagement with the periphery of said orifice plate, a mechanical bridge having a pair of legs for engagement with the external surfaces of said pipes on opposite sides of said flanges and a center portion extending between said legs and over said flanges, each of said legs having positioning provisions for engagement with at least two circumferentially spaced points on said pipe external surfaces whereby said center portion provides a reference of the center of said pipes when said positioning provisions on each of said legs are engaged with said pipe surfaces, and a clamp for adjustably securing said gauging member to said bridge center portion with said gauging part a predetermined distance in a radial direction from the center of said pipes when its said positioning provisions are engaged with said pipe surfaces.

2. An apparatus for centering an orifice plate in a pipe conduit comprising the combination with a pair of pipes forming part of said conduit and having facing flanges for holding an orifice plate in a centered position therebetween, of a gauging tool comprising a mechanical bridge having a pair of legs for engagement with said pipes on opposite sides of said flanges and a center portion extending between said legs and over said flanges, each of said legs having a V-shaped recess at its outer end such that it engages one of said pipes at circumferentially spaced points, said center portion providing a reference of the center of said pipes when each of said legs is engaged therewith, and a gauge member adjustably supported on said center portion and depending therefrom in a direction radially of said pipes when said legs are engaged therewith and being adapted for insertion into the space between said flanges for gauging engagement with the outer edge of an orifice plate to be centered therein.

References Cited in the file of this patent

UNITED STATES PATENTS

| | | |
|---|---|---|
| 2,020,432 | Parker | Nov. 12, 1935 |
| 2,337,957 | Akins | Dec. 28, 1943 |
| 2,656,607 | Harding | Oct. 27, 1953 |